(No Model.) 2 Sheets—Sheet 1.
F. I. PEARCE.
TAKE-UP BOX FOR SHAFT JOURNALS.
No. 277,157. Patented May 8, 1883.
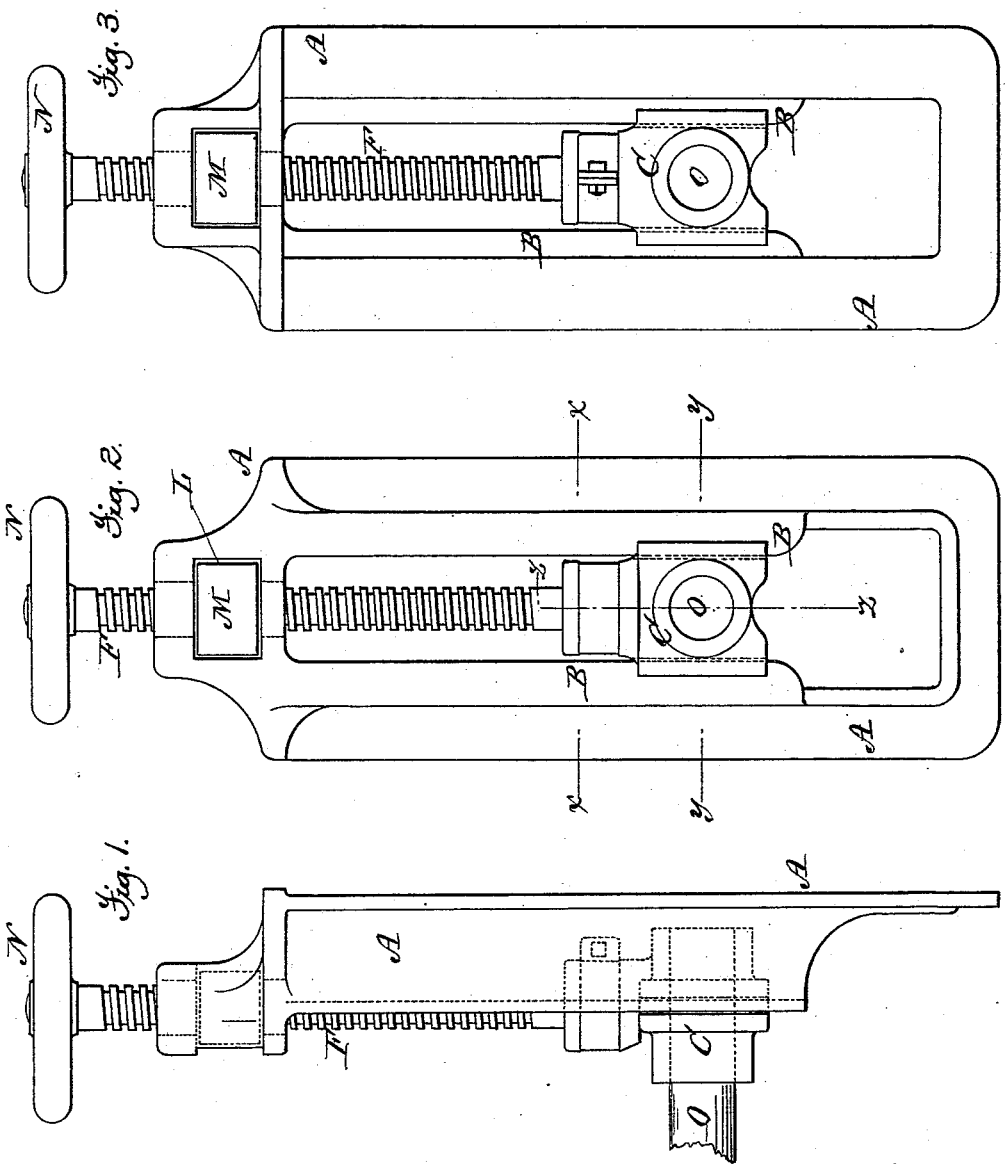

(No Model.) 2 Sheets—Sheet 2.
F. I. PEARCE.
TAKE-UP BOX FOR SHAFT JOURNALS.
No. 277,157. Patented May 8, 1883.
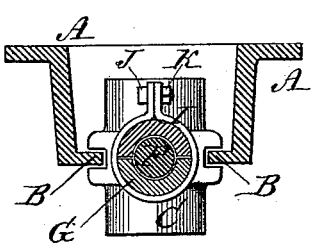
Fig. 4.
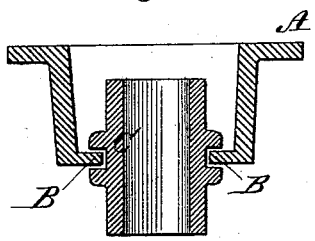
Fig. 5.
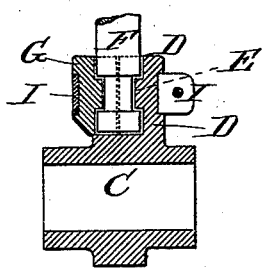
Fig. 6.
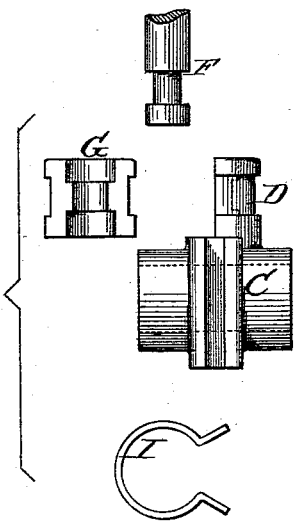
Fig. 7.
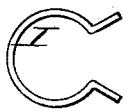
Attest:
M. H. Smith
Wm H. Myers
Inventor,
Frank I. Pearce
By
J. N. McIntire
Atty.
N. PETERS, Photo-Lithographer, Washington, D. C.

United States Patent Office.

FRANK I. PEARCE, OF CHICAGO, ILLINOIS, ASSIGNOR TO THE LINK-BELT MACHINERY COMPANY, OF SAME PLACE.

TAKE-UP BOX FOR SHAFT-JOURNALS.

SPECIFICATION forming part of Letters Patent No. 277,157, dated May 8, 1883.

Application filed March 23, 1883. (No model.)

*To all whom it may concern:*

Be it known that I, FRANK I. PEARCE, of Chicago, in the county of Cook and State of Illinois, have invented Improvements in Take-Up Boxes for Shaft-Journals, &c.; and I do hereby declare that the following is a full, clear, and exact description thereof, reference being had to the accompanying drawings, making part of this application.

My invention relates to a novel device or contrivance for the purpose of adjusting and holding in adjustment the journal-boxes, adapted to support at either end a shaft, which may require to be moved bodily in either of two directions, or which may require to be moved at either end for the purpose of varying the direction of its axial line.

I have designed my new contrivance for use principally in connection with the shafts or arbors which carry the pulleys at either end of the elevator-belts, and have designated it as a "take-up box;" but it may, of course, be employed in connection with other shafting wherever it may be desired to have the bearing-boxes of a shaft or shafting adjusted in the manner above alluded to.

Previous to my invention it has been customary to have the journal-boxes carrying or supporting lines of shafting made adjustable with set-screws for the purpose of lining up the shaft; but in all such arrangements, so far as my knowledge goes, the complex universal-joint arrangement has been necessary for the purpose of permitting the designed adjustment of the boxes. I propose to provide for use, wherever occasion may require it, a simple, cheap, and efficient means for setting and holding the journal-boxes of a shaft in different positions relatively, or otherwise, for the purpose of either moving the shaft bodily to take up all undue slack in the belt passing over pulleys carried by such shafts, as well as for lining the shaft to set and hold it in parallelism with its mate in cases where an endless belt runs on pulleys mounted on two such shafts.

To these main ends and objects my invention consists in the novel construction and combination of devices going to make up the contrivance, which will be hereinafter more fully explained, and the novel points of which will be particularly pointed out in the claims of this specification.

To enable those skilled in the art to which my invention appertains to make and use the same, I will now proceed to more fully describe my novel contrivance, referring by letters to the accompanying drawings, which make part of this specification, and in which I have illustrated my invention by preference as applied to the shaft of a grain-elevator that is located at the lower end of, or in what is called the "boot" of, the elevator. As in this application of my invention the box-adjusting devices are applied in duplicate on opposite sides of the boot, where are located the boxes in which are journaled respectively the opposite ends of the shaft, I have shown in the drawings the devices which are applied at one side of the boot and the journal which supports one end of the shaft, and a description of these devices would serve to give a correct idea of the entire contrivance as applied to both ends of the shaft to be adjusted.

In the drawings, Figure 1 is a side elevation of the set of devices employed at one side of the elevator-boot and embracing my invention. Fig. 2 is an elevation looking at the outer face of the frame which carries the adjustable journal-box. Fig. 3 is an elevation looking at the inner side or face of said frame. Fig. 4 is a horizontal section at the line $xx$ of Fig. 2. Fig. 5 is a horizontal section at the line $yy$ of Fig. 2. Fig. 6 is a partial vertical section at the line $zz$ of Fig. 2, and Fig. 7 is a view showing separately the half-collar at the collar-like extension of the journal-box and the clamping device.

In the several figures the same part will be found designated by the same letter of reference.

A represents a frame-like casting, which is adapted to be screwed or bolted to one side of the elevator-boot, and which is formed, as shown, with ways B B, on which slides the adjustable journal-box C. This box is formed with an extension or a neck-like portion, D, which is shaped after the fashion of a grooved half-collar, the interior of which has a semi-annular projection, E, that takes into an annular groove made near the end of the screw-shaft F. Engaging with the other half of the annular groove in the end of said screw-shaft is another semi-annular projection, which is formed on the interior of the half-collar G, which, when in its normal position, forms, in conjunction with the collar-like device of the adjustable box, a complete collar, which surrounds the free end of the screw-shaft, in the manner shown.

I is a clamping-clip or securing-band, which holds the said half-collar and the said collar-like device of the box in place around the end of the shaft, said clamping-band having its free ends sprung together and held in place by an ordinary screw or bolt, J, and nut K.

Within the open space L, formed at the upper end of the cast frame A, is placed a large nut, M, which is adapted to engage with the screw-shaft F, which latter, as shown, works within said nut and passes through holes in the cast frame A, which are somewhat larger than the extreme diameter of said screw-shaft.

N is an ordinary hand-wheel applied to the outer end of the screw-shaft for the purpose of easily turning said shaft, while O represents a portion of the shaft usually arranged within the elevator-boot, and which carries the pulley on which runs the lower portion of the belt of the elevator proper.

The general operation of the parts above described is about as follows: By turning the screw-shaft F in one direction or the other the adjustable journal-box C will be moved, as may be desired, in either direction, and will be held in any position to which it may be adjusted by reason of the large nut M being confined in the direction of the length of the screw-shaft within its housing L in the cast frame shown. More or less play is permitted between the adjustable box C and the ways B, between which it is mounted and by which it is guided, so that said adjustable box is capable of more or less movement in directions which will permit the shaft O to have the line of its axis somewhat varied; and as the screw-shaft F is somewhat smaller in diameter than the holes through which it passes in the upper portion of the casting A, it follows that said screw-shaft is capable of more or less lateral movement, which together with the capacity of the adjustable box C to move laterally more or less renders the contrivance capable of being operated so as to adjust in either direction one end of the shaft O without moving the other end, the two adjustable journal-boxes oscillating slightly to permit any such change in the line of said shaft.

When desired, the shaft O may be either raised or lowered bodily to a requisite extent by turning the hand-wheels N of the screw-shafts of the duplicate devices, arranged at either side of the elevator-boot. When, on the other hand, it is desired merely to adjust or vary the axial line of the shaft O, either end of said shaft may be raised or lowered by turning the hand-wheel N of only one of the duplicate adjusting contrivances.

Of course, if deemed expedient, the free end of the screw-shaft F may be made somewhat spherical, after the fashion of a ball-and-socket joint, and in lieu of the projections E, which engage with the annular groove of F, the half-collar G and the collar-like device D of the adjustable box may be formed with internal hemispherical depressions to accommodate said spherical end of the screw-shaft; but such construction would involve greater expense of structure, and I therefore consider the simple form shown to be the more desirable of the two, since it is more economical of manufacture and is adapted to answer fully the purposes of my invention.

Having now so fully described the construction and operation of my improved contrivance that those skilled in the art can make and use my invention, and wishing to be understood that the latter may be carried out in slightly different form from that shown and in places where a different sort of shaft from that used at the lower end of an elevator-leg may be employed, what I claim as new, and desire to secure by Letters Patent, is—

1. In combination with the adjustable journal-box and suitable guideways on which it is adapted to move and to have more or less lateral play, an adjusting screw-shaft, F, having its free end positively engaged with said adjustable journal-box, and a holding-nut, M, arranged within a housing, L, (in the main casting, as shown,) through which said screw-shaft passes, in such manner as to have more or less lateral play, all in the manner specified, for the purpose set forth.

2. In combination with the adjustable journal-box, formed with a half-collar-like extension, D, the grooved end of the adjusting screw-shaft F, the half-collar G, and a clamping or securing band, I, the said parts being constructed and arranged to operate together in the manner and for the purpose specified.

In testimony whereof I have hereunto set my hand and seal this 16th day of March, 1883.

FRANK I. PEARCE. [L. S.]

In presence of—
E. A. STEVENS,
WILL. P. SISSON.